United States Patent [19]

Modahl et al.

[11] 3,783,631
[45] Jan. 8, 1974

[54] ABSORPTION HEAT EXCHANGE SYSTEMS, METHODS AND ABSORBENT COMPOSITIONS

[75] Inventors: Robert Modahl, Galesville; Paul J. Lynch, La Crosse, both of Wis.

[73] Assignee: The Trane Company, La Crosse, Wis.

[22] Filed: Sept. 13, 1972

[21] Appl. No.: 288,788

Related U.S. Application Data

[63] Continuation-in-part of Ser. No. 168,870, Aug. 4, 1971, abandoned.

[52] U.S. Cl. ........................ 62/112, 62/476, 252/69
[51] Int. Cl. .......................................... F25b 15/06
[58] Field of Search .................. 62/112; 252/67, 68, 252/69, 71, 73

[56] References Cited
UNITED STATES PATENTS

| 3,580,759 | 5/1971 | Albertson et al. ................. 252/68 X |
| 3,609,087 | 9/1971 | Macriss et al. .................... 62/112 X |

*Primary Examiner*—William F. O'Dea
*Assistant Examiner*—Peter D. Ferguson
*Attorney*—L. Paul Burd et al.

[57] ABSTRACT

Absorption heat exchange systems and methods, and especially absorption refrigeration systems and methods, employing an absorbent comprised of an aqueous solution of a lithium halide salt and including at least one fluoroalcohol which is stable at high temperatures and which increases the rate of absorption in the absorber and the rate of heat transfer in the condenser for a given amount of surface.

19 Claims, 7 Drawing Figures

A - NO ADDITION

B - 1H,1H, 7H-DODECAFLUORO-1- HEPTANOL

C - 1,1,1-TRIFLUORO-2-OCTANOL

D - DODECAFLUORO-1-METHYL HEPTANOL-1

E - 2,2,3,3,4,4,5,5,6,6,7,7 DODECAFLUORO-1,1 DIMETHYL HEPTANOL-1

F - 2,2,3,3,4,4,5,5,6,6 DECAFLUORO-1 METHYL HEPTANOL-1

G - 3,3,4,4,5,5,6,6,7,7,8,8 DODECAFLUORO-1-OCTANOL

H - 2,2,3,3,4,4,5,5 OCTAFLUORO-1 METHYL PENTANOL-1

J - 1,1,1 TRIFLUORO-2-NONANOL

K - 2-(PENTAFLUOROPHENYL) ETHANOL

L - HEXAFLUORO-2- PHENYLISOPROPANOL

M - HEXAFLUORO-2-(p-TOLYL) ISOPROPANOL

A — NO ADDITION

B — 1H,1H,7H-DODECAFLUORO-1-HEPTANOL

C — 1,1,1-TRIFLUORO-2-OCTANOL

D — DODECAFLUORO-1-METHYL HEPTANOL-1

E — 2,2,3,3,4,4,5,5,6,6,7,7 DODECAFLUORO-1,1 DIMETHYL HEPTANOL-1

F — 2,2,3,3,4,4,5,5,6,6 DECAFLUORO-1 METHYL HEPTANOL-1

G — 3,3,4,4,5,5,6,6,7,7,8,8 DODECAFLUORO-1-OCTANOL

H — 2,2,3,3,4,4,5,5 OCTAFLUORO-1 METHYL PENTANOL-1

J — 1,1,1 TRIFLUORO-2-NONANOL

K — 2-(PENTAFLUOROPHENYL) ETHANOL

L — HEXAFLUORO-2-PHENYLISOPROPANOL

M — HEXAFLUORO-2-(p-TOLYL) ISOPROPANOL

ABSORPTION HEAT EXCHANGE SYSTEMS, METHODS AND ABSORBENT COMPOSITIONS

This application is a continuation-in-part of application Ser. No. 168,870, filed Aug. 4, 1971, now abandoned.

BACKGROUND OF THE INVENTION

1. Field of the Invention

This invention relates to the art of heating and cooling, and particularly to air conditioning, employing a heat operated absorption refrigeration system and methods and absorbent compositions for operation with high temperature heat sinks.

2. Description of the Prior Art

The prior art is exemplified by the present inventors' prior U.S. Pat. No. 3,296,814 granted Jan. 10, 1967, and U.S. Pat. No. 3,585,177 of John L. M. Holman, granted June 8, 1971, both assigned to the assignee of the present invention, the disclosures of both of which are incorporated herein by reference. As disclosed therein, absorbent refrigeration systems include a liquid absorbent material which remains in liquid form throughout the cycle of operation and a refrigerant material having both a liquid phase and a vapor phase. The system includes a generator in which the absorbent, diluted with absorbed refrigerant, is heated to boil off some of the refrigerant. This vapor is condensed to liquid by heat exchange with an external cooling fluid maintained at a suitable temperature by a heat sink. The liquefied refrigerant flows to an evaporator maintained at reduced pressure so that the refrigerant boils at a relatively low temperature and produces refrigeration. In the evaporator, the cold refrigerant absorbs heat from an external fluid which is circulated through the evaporator and is thereby cooled to substantially the evaporator temperature and then circulated to a refrigeration load.

The vaporized refrigerant from the evaporator is conducted to an absorber where it is absorbed by concentrated absorbent supplied from the generator. The absorption of refrigerant vapor maintains the low pressure in the evaporator. The absorbent is cooled to operating temperature by heat exchange with the heat sink. From the absorber the diluted absorbent passes to the generator to be concentrated by heating to boil off some of the refrigerant and repeat the cycle.

SUMMARY OF THE INVENTION

With the advancing absorption refrigeration technology, ever increasing demand for air conditioning and more sophisticated refrigeration machines, there is a continuing need and search for improved absorbent materials of greater capacity. In the case of two stage absorption machines as disclosed in the aforesaid Holman patent, in which the absorbent is exposed to higher operating temperatures, there is an increasing need for absorbent compositions having good high temperature stability. It has been discovered that the rate of absorption of lithium halide solutions can be increased by the addition of a small quantity of a fluoroalcohol. It has been found that the addition of fluoroalcohols to the absorbent material is the equivalent of additional mechanical surface in the absorber section of the machine, drop-wise condensation in the condenser is promoted and the overall capacity of a given machine is increased. At the same time, the fluoroalcohol is thermally stable in operation of the machine.

BRIEF DESCRIPTION OF THE DRAWINGS

The invention is illustrated in the accompanying drawings in which corresponding parts are identified by the same numerals and in which.

DESCRIPTION OF THE PREFERRED EMBODIMENTS

The additive

Figure 1:
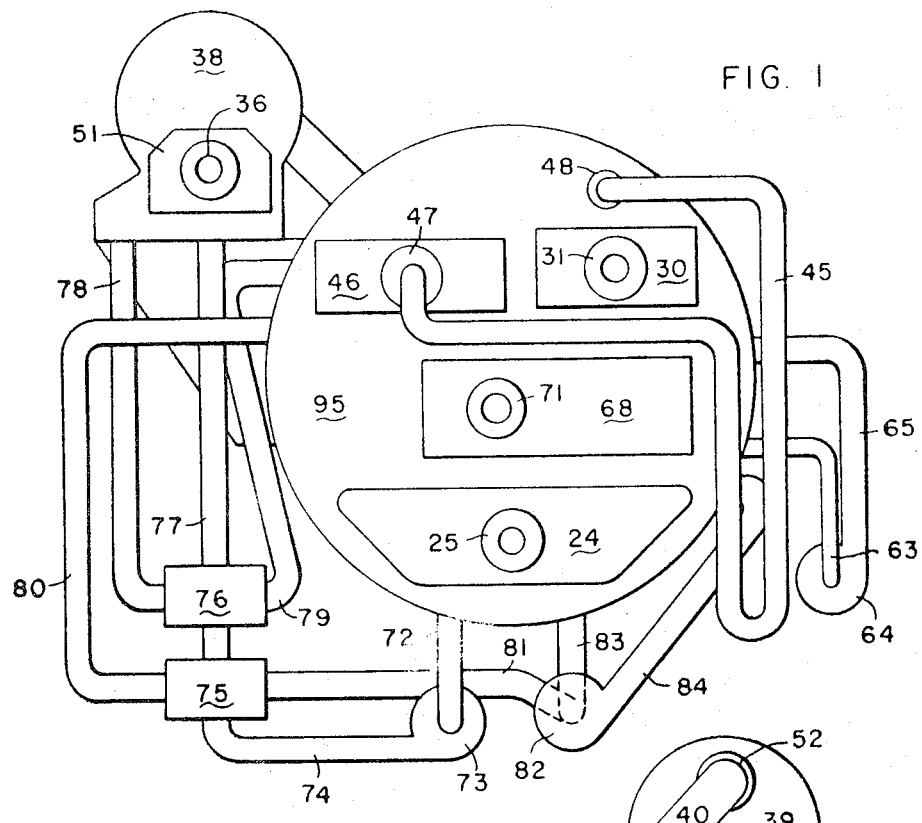
FIG. 1 is a front view of a two-shell absorption refrigeration machine in which the present invention may be utilized.

The compounds which may be used as improved absorption capacity additives are aliphatic primary fluoroalcohols, aliphatic secondary fluoroalcohols, aliphatic tertiary fluoroalcohols and cyclic fluoroalcohols having the general formula:

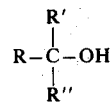

in which R, R' and R" are selected from the group consisting of hydrogen, straight chain, branched chain and cyclic hydrocarbon radicals and straight chain, branched chain and cyclic hydrofluorocarbon radicals. The total number of carbon atoms is from 5 to 10 per molecule. At least one

group or

group per molecule is present.

No fluorine is present on the same carbon as the hydroxyl group. Preferably, the melting point is less than 32° F and the normal boiling point is at least 270° F. The additive need not be miscible with the brine. It appears that the molecule should preferably be non-symmetrical, that is, neither symmetrical or nearly so with respect to location of the hydroxyl group.

Representative fluoroalcohols within the defined formula include aliphatic primary fluoroalcohols: 1H, 1H, 5H-octafluoro-1-pentanol; 1H, 1H, 7H Dodecafluoro- 1-heptanol; 2(1,1,1 Trifluoro) ethyl-1-hexanol; 3,3,4,4,5,5,6,6,7,7,8,8 Dodecafluoro-1-octanol; 2(pentafluoro)ethyl-1-hexanol; 2(1,1,1 Trifluoro) ethyl, 2 fluoro-1-hexanol; 2(pentafluoro) ethyl, 2 fluoro-1-hexanol; 7,7,7 Trifluoro-1-heptanol; 6,6,6 Trifluoro-1-hexanol; 2,2,3,3, Tetrafluoro-1-hexanol; 2,2,3,3 Tetrafluoro-1-heptanol; 2,2,3,3 Tetrafluoro-1-octanol; 6,6 Difluoro-1-hexanol; 7,7 Difluoro-1-heptanol; 8,8 Difluoro-1-octanol; aliphatic secondary fluoroalcohols: 1,1,1 Trifluoro-2-octanol; 1,1,1 Trifluoro-2-nonanol; 2,2,3,3,4,4,5,5,6,6 Decafluoro-methyl heptanol-1; 1,1,1,2,2,3,3 Heptafluoro-4-octanol; Dodecafluoro-1-methyl heptanol-1; 2,2,3,3,4,4,5,5 Octafluoro-1-methyl pentanol-1; aliphatic tertiary fluoroalcohols; Dodecafluoro-1,1-dimethyl heptanol-1; 2,2,3,3 Tetrafluoro-1,1-dimethylpropanol; and cyclic fluoroalcohols, including alcohols having a hydrocarbon unsaturated ring with a fully fluorinated or partially fluorinated alcohol side chain and a fully or partially fluorinated unsaturated ring with a hydrocarbon or partially fluorinated alcohol side chain: Hexafluoro-2-phenylisopropanol; Hexafluoro-2-(p-tolyl) isopropanol; 2-(pentafluorophenyl) ethanol; 1-(Pentafluorophenyl) ethanol; 2,3,4,5,6-Pentafluorobenzyl alcohol; 2-(2,3 Difluorophenyl) ethanol; 1,1,1 Trifluoro-2-phenyl-2-propanol; 1,1,1 Trifluoro-2-(2,3 Difluorophenyl) propanol and 1,1,1 Trifluoro-2-(2,2 Difluorocyclohexyl) propanol.

The fluoroalcohol additive is included by admixture with the absorbent material with which the absorption refrigeration system is conventionally charged. Typically this is an aqueous solution of lithium halide, such as lithium bromide or lithium iodide separately or in admixture, in total salt concentration ranging between about 55 to about 80 percent by weight. Ethylene glycol is sometimes added to suppress crystallization of the salts. Small amounts of corrosion inhibiting substances are commonly added.

It has been determined experimentally that fluoroalcohols added in proportion as little as 10 milligrams of fluoroalcohol per liter of brine doubles the absorption rate as compared with brine containing no additive. The maximum increase in absorption rate occurs with about 100 milligrams of fluoroalcohol per liter of brine. While higher concentrations of fluoroalcohol improve the absorption rate as compared with brine having no additive, the rate of increased absorption is reduced. Because the proportion of fluorocarbon additive is so small and some improvement in absorption rate is obtained even when amounts far in excess of the optimum amount are used, no critical upper limit of fluorocarbon additive has been established. It is desirable that the additive be present in proportion between about 10 and about 1,000 milligrams per liter of brine and preferably in the proportion of about 100 milligrams per liter.

Capacity and Stability Tests

A series of tests were conducted to determine the improved rates of absorption and thermal stability of absorbent compositions including each of several different fluoroalcohol additives. These tests are described below.

Experimental Apparatus used for Capacity Tests

Two evacuated vessels were utilized, one to simulate the evaporator and the other the absorber stage in the absorption refrigeration cycle. In early tests, the evaporator vessel was partially filled with pure water (refrigerant) and the absorber vessel was partially filled with about 60 weight per cent aqueous lithium bromide (absorbent). In later tests, the evaporator was partially filled with about 50 weight percent aqueous lithium bromide and the absorber with about 54 percent. The reason for this change is given below.

The vapor phases of the two vessels were connected by a passageway which could be closed by a valve. The passageway also was connected to a vacuum pump through another valve arrangement.

The absorber vessel was equipped with a means for heating the lithium bromide solution.

Experimental Procedure for Capacity Tests

In preparation for a test series (several test runs with a specific capacity additive) the apparatus was carefully cleaned, particularly of surface active materials such as a previously tested additive. Then, under the early test procedure, fresh water was charged to the evaporator vessel and fresh 60 percent LiBr to the absorber vessel. Next, the interconnecting passageway was closed and each vessel separately evacuated of air. Finally, the vacuum pump was valved off and the system was ready for testing.

At 77° F, the vapor pressure of water in the evaporator is about 24 mm Hg and the vapor pressure of 60 per cent LiBr in the absorber is about 2 mm. The difference is a measure of the absorption mass transfer driving force. The driving force can also be expressed as the difference between the evaporator water temperature and the absorber brine saturation temperature, where saturation temperature is defined as the temperature at which the vapor pressure of pure water is the same as the vapor pressure of the brine solution at its temperature and concentration. The saturation temperature of 60 per cent LiBr in the absorber at 77° F is about 11° F, so with pure water in the evaporator at 77° F the driving force would be 66° F. Heating the brine increases its vapor pressure and saturation temperature and is a convenient way to obtain data over a range of driving forces. The tests were run with the evaporator always about 77° F and the absorber between 77° and 154° F so the driving force ranged from 0° up to 66° F.

A test run began with the opening of the valve in the vapor passageway between the two vessels. Immediately, the pressure decreased in the evaporator vapor space and increased in the absorber vapor space. Seeking vapor-liquid equilibrium, water continued to evaporate in the evaporator vessel and to be absorbed in the brine until the valve was closed to end the test run, generally three minutes after start. Since no means was provided for supplying or withdrawing heat energy during a run, the evaporator water temperature dropped and the brine temperature rose. As a result, the mass transfer rate decreased as a run progressed. The average absorption rate was indicated by the weight loss of the evaporator vessel.

A series of tests consisted of several runs with a specific capacity additive at driving forces ranging from 0 to 22 mm Hg. Additive concentrations ranged from zero to several thousand milligrams per liter of brine.

In later tests, the solution concentrations and temperatures were changed so as to better represent the pressure that actually exists in the evaporator and the absorber of commercial LiBr absorption machines. The change involved using about 54 per cent LiBr in the absorber and about 50 per cent LiBr in the evaporator. The initial absorber temperature was always about 77°

F and the initial evaporator temperature was between 65° and 95° F. The initial driving force thereby ranged between 0° and 25° F expressed as the difference between the evaporator and absorber saturation temperatures.

Results of Capacity Tests

Figure 5:
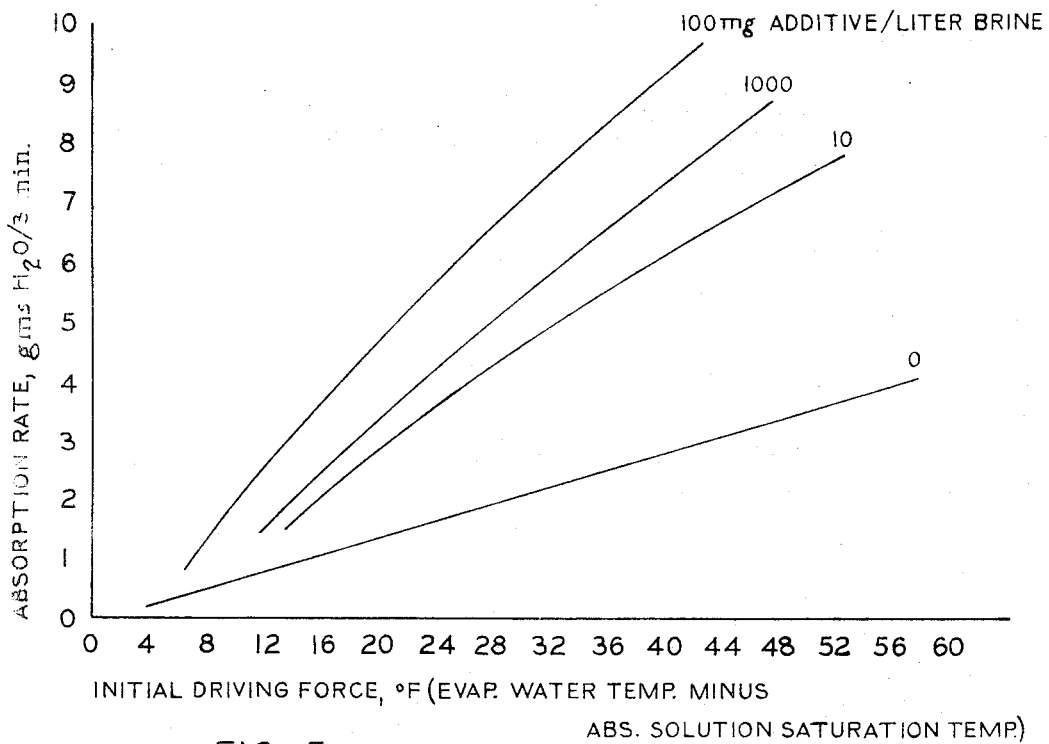
FIG. 5 is a graphic illustration of the effect of various concentration levels of 1H, 1H, 7H-Dodecafluoro-1-heptanol on the absorption rate of lithium bromide brine.
Figure 6:
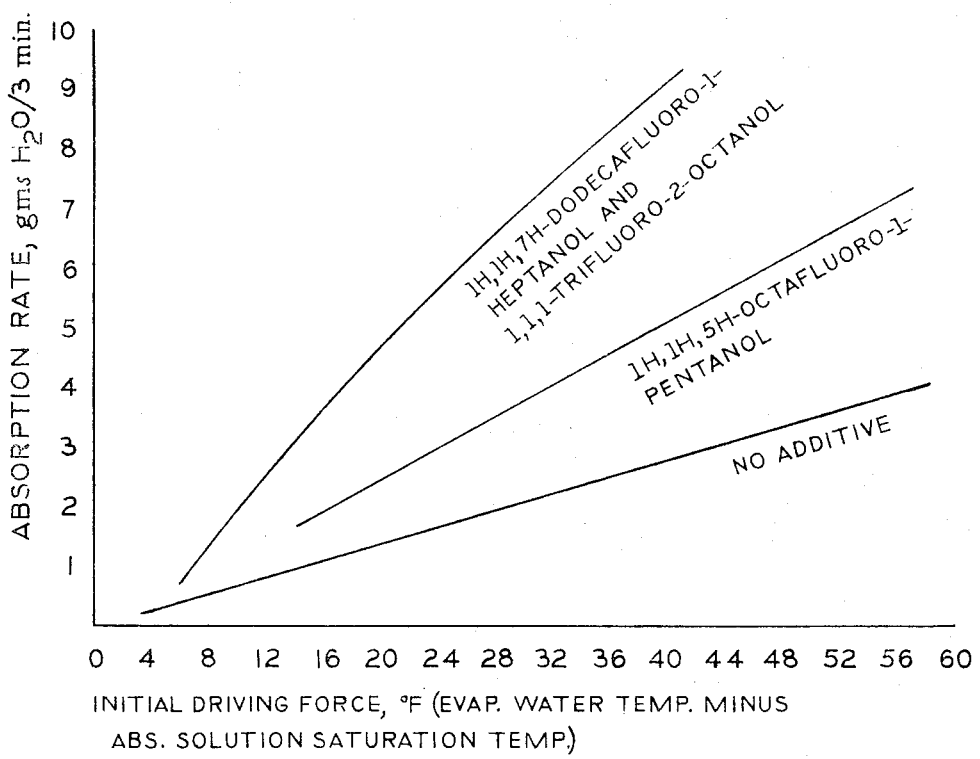
FIG. 6 is a graphic illustration of the effect of several fluoroalcohol additives on the absorption rate of lithium bromide brine as compared to no additive.
Figure 7:
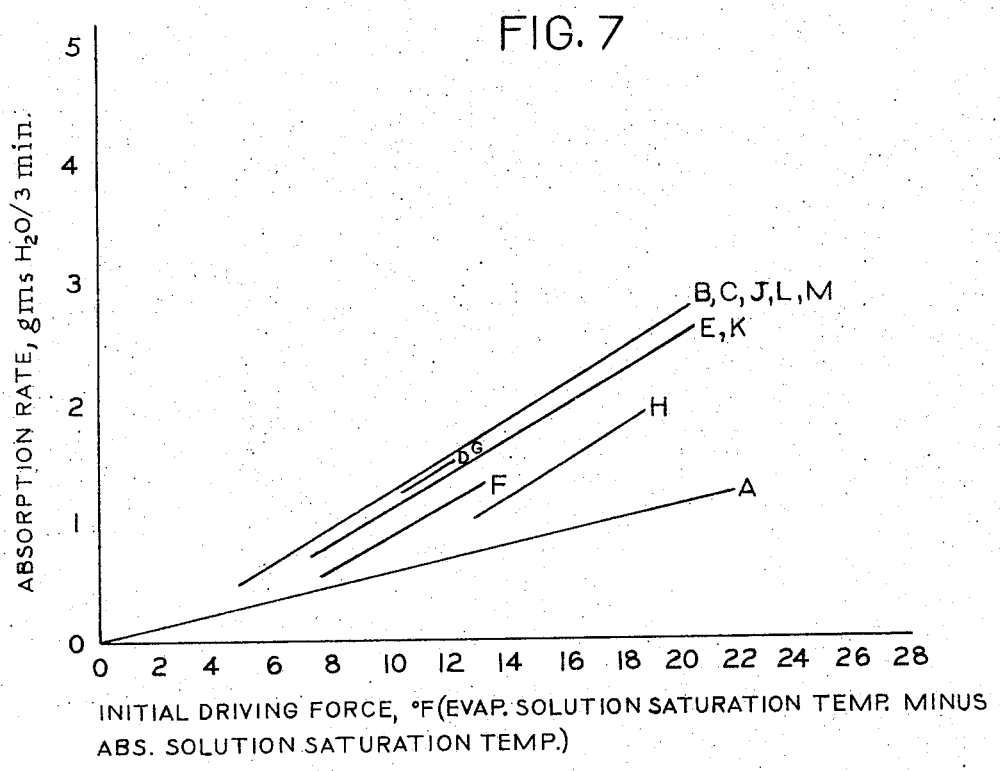
FIG. 7 is a graphic illustration of the effect of other fluoroalcohols on the absorption rate.

Test data is represented by the graphs of FIGS. 5, 6 and 7, where average absorption rates are plotted as a function of initial driving force.

FIG. 5 illustrates the effect various concentration levels of 1H, 1H, 7H-Dodecafluoro-1-heptanol have on the absorption rate. The graph is based on results obtained with the early test procedure where pure water was used in the evaporator and 60 per cent brine in the absorber. As little as 10 mg/liter doubles the non-additive absorption rate and the maximum rate occurs with about 100 mg/liter. Higher concentrations bring about a reduced rate because pools of the immiscible fluoroalcohol float on the brine and reduce the amount of effective surface area. For each of the fluoroalcohols tested it has been shown that very low additive concentrations produce marked effects and that maximum absorption occurs at about 100 mg/liter. The maximum absorption rate curves for three fluoroalcohols are shown in FIG. 6 and represent results obtained with early test procedure. FIG. 7 also represents maximum absorption rate data for various fluoroalcohols and is based on results obtained by the later test procedure.

Experimental Apparatus used for Stability Tests

The stability tests were conducted in general purpose stainless steel bombs. The test vessels were cooled and evacuated before starting the tests. The bombs were then placed in ovens at 350° F and 450° F. Samples of the alcohol phase of the various test samples were removed periodically and analyzed by gas chromatography.

Description and Results of Fluoroalcohol Stability Tests 1H, 1H, 5H-Octafluoro-1-Pentanol was tested in the presence of aqueous LiBr, LiOH and $As_2O_3$ for a period of 545 hours at 450° F. Samples of the alcohol phase were removed periodically and subjected to gas chromatography analysis. A comparison of the chromatograms of the original alcohol and of the alcohol after exposure to test conditions for 545 hours indicates that there are only very slight differences between the original alcohol and the alcohol removed after exposure to test conditions. The test vessel was still under vacuum at the termination of the test indicating that there was no significant formation of gaseous degradation products.

Several stability tests of 1H, 1H, 7H-Dodecafluoro-1-Heptanol were conducted in the presence of various concentrations of LiBr brine and $As_2O_3$. The alcohol content was also varied in several of these tests. Tests were run at 450° F and 350° F for time periods of up to 1,000 hours. Samples of the alcohol phase were removed periodically and analyzed by gas chromatography. A comparison of the chromatograms of the alcohol taken from a typical test and of the original alcohol indicates that only very slight changes have occurred after 671 hours.

Several stability tests of 1,1,1-Trifluoro-2-Octanol were conducted which exposed this alcohol to various concentrations of LiBr brine and $As_2O_3$ at temperatures of 350° and 450° F for time intervals up to 565 hours. Samples of the alcohol phase were removed periodically and subjected to gas chromatography analysis. Examination of the chromatograms of the alcohol removed from a typical test after 565 hours and of the original alcohol as received from the vendor indicates that there is no significant change in the alcohol after exposure to test conditions for 565 hours. The absence of any significant pressure increase within the test vessel also indicates that there are probably no gaseous degradation products formed.

An Exemplary Absorption Refrigeration System

Figure 2:
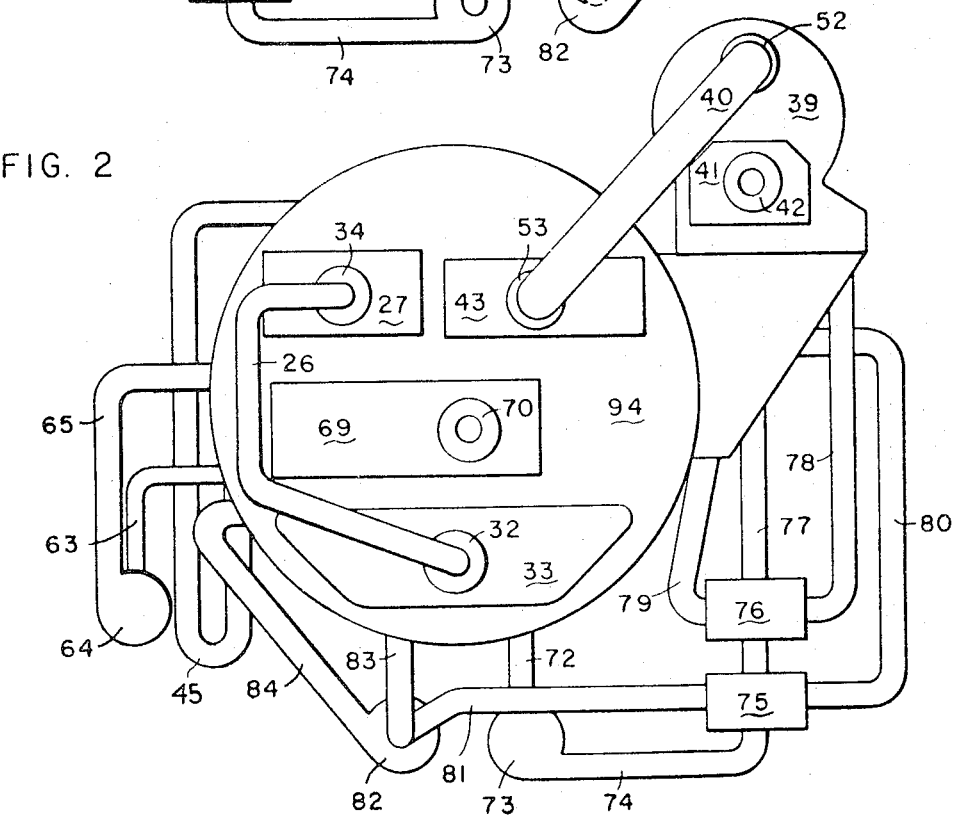
FIG. 2 is a rear view of the absorption refrigeration machine of FIG. 1.
Figure 3:
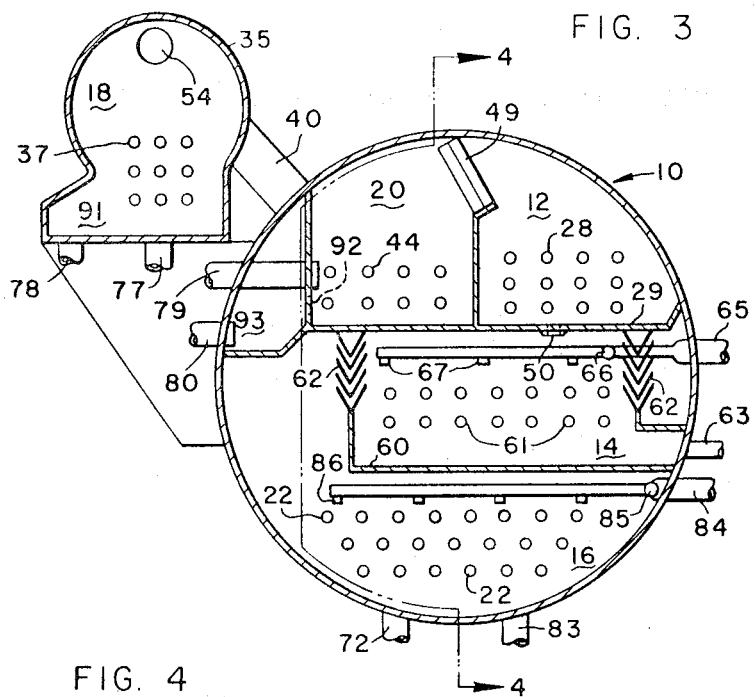
FIG. 3 is a view of the absorption refrigeration machine of FIG. 1 in which the front tube sheets of the two shells and the external piping have been omitted.

Referring to FIGS. 1, 2 and 3, the absorption refrigeration machine illustrated, being that of the aforesaid Holman patent, comprises a shell 10 which encloses a condenser section 12, an evaporator 14, an absorber 16, and a second stage low pressure generator 20. A second shell 35 encloses a first stage, high pressure generator 18.

The absorber 16 has a heat exchanger, comprising longitudinally extending tubes 22, which is supplied with cooling fluid (from a source not shown) through header 24. Connection with the conduit from the cooling fluid source is made with flange 25. The cooling fluid, which can be water which is evaporatively cooled by air, is conducted from header 33 by conduit 26 from the rear of the heat exchange tubes 22 to a header 27 which supplies heat exchange tubes 28 in condenser 12. Connection of conduit 26 with headers 33 and 27 is made by means of flanges 32 and 34, respectively. A wall 29 substantially encloses the condenser section. The cooling fluid leaves the condenser through header 30 and returns to the cooling fluid source via a conduit (not shown) connected to flange 31.

High pressure steam, or other heating medium, flows from a source such as a boiler (not shown) into header 51 by connection with flange 36. The steam flows from header 51 into heat exchange tubes 37 in high pressure generator 18. End plate 38 seals the end of shell 35, and also is the tube sheet for heat exchange tubes 37. End plate 39 serves the same purpose at the opposite end of the generator 18 and additionally provides connection with conduit 40. Heat exchange tubes 37 terminate within end plate 39 and in fluid communication with header 41. Heat from condensing steam in the heat exchange tubes 37 causes dilute absorbent solution, such as an aqueous solution of lithium bromide containing a small amount of fluoroalcohol, present in the first stage generator to boil. The steam condensate flows back to the steam generating source.

The refrigerant vapor generated in the first stage generator 18 flows through conduit 40 and into the second stage generator 20. Conduit 40 is connected to flanges 52 and 53, the latter of which allows access to header 43. The refrigerant vapor flows from header 43 into heat exchange tubes 44. The refrigerant vapor condenses and releases heat to further concentrate intermediate strength solution present in the second stage generator 20.

Trap 45 is connected with heat exchange tubes 44 via header 46 onto which it is attached at flange 47. Condensed refrigerant from heat exchanger tubes 44 enters the condenser 12 at a connection 48 above header 30. The difference in pressure between the condenser and heat exchange tubes 44 forces the condensed refrigerant from the tubes 44 into the condenser 12. Trap 45 functions to prevent flow of any refrigerant vapor from heat exchange tubes 44 into the condenser 12. The vapor produced from the boiling intermediate strength solution in the second stage generator 20 passes through eliminators 49 where entrained liquid is removed. The vapor is condensed into a liquid in condenser 12. Liquid refrigerant flows from the condenser through opening 50 into evaporator 14.

The liquid refrigerant is evaporated in evaporator 14, thus removing heat from the fluid in heat exchange tubes 61. The refrigerant vapor produced passes through eliminators 62 to remove entrained liquid and into the absorber section 16. Unevaporated liquid refrigerant is collected in pan 60, from which it enters conduit 63, and is recirculated by pump means 64 through conduit 65 into spray header 66. From header 66 the liquid refrigerant is sprayed over heat exchange tubes 61 through spray nozzles 67. Fluid from a heat load is circulated through heat exhcange tubes 61 by connection with flanges 70 and 71 on headers 69 and 68. The fluid circulated through heat exchange tubes 61 is cooled by the evaporating refrigerant. It is thereafter returned to the heat load.

Absorbent solution present in absorber 16 absorbs refrigerant vapor produced in evaporator 14. The solution from the absorber 16 flows through a conduit 72 in the bottom of the absorber section. The absorbent solution from conduit 72 is circulated by pump 73 through conduit 74, a low temperature heat exchanger 75, a high temperature heat exchanger 76, and conduit 77 from which it enters high pressure generator 18. The absorbent solution flowing into generator 18 is partially concentrated therein.

The absorbent solution enters the absorber at about 135° F and it mixes with solution from the absorber. The mixture is at about 120° F as it is sprayed into the absorber. The solution in the bottom of the absorber is at about 104° F.

The partially concentrated solution from high pressure generator 18 flows through conduit 78 to high temperature heat exchanger 76 in which it gives up heat to weak solution flowing into conduit 77. It then flows through conduit 79 into low pressure generator 20, in which it is further concentrated. The concentrated solution from the second stage generator 20 flows through conduit 80, through low temperature heat exchanger 75 into conduit 81 which is connected to the inlet of pump 82. Dilute solution flowing from absorber 16 through conduit 83 also enters the inlet of pump 82 where it is mixed with the concentrated solution flowing from conduit 81. The weak and concentrated solutions are mixed in pump 82 and are forced through conduit 84 to spray header 85, from which it is distributed over heat exchange tubes 22 by spray nozzles 86.

Figure 4:
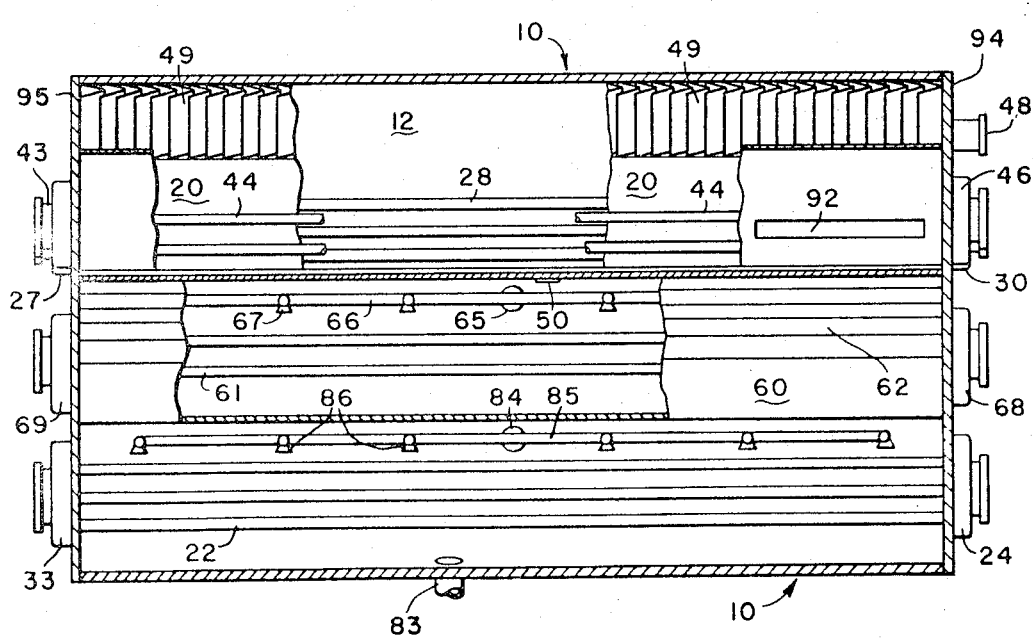
FIG. 4 is a side view of the main shell taken along section A—A of FIG. 3.

Referring now to FIGS. 3 and 4, generator shell 35 has an upper circular section and a lower liquid tank section 91. Partially concentrated absorbent solution is collected in tank 91 before it flows into conduit 78. Refrigerant vapor produced in high pressure generator 18 flows through opening 54 into conduit 40. Intermediate strength flows into low temperature generator 20 through conduit 79. Concentrated solution flows out of low temperature generator 20 through weir 92 into compartment 93. From this compartment the concentrated absorbent solution flows into conduit 80.

All of the heat exchange tubes are longitudinally extending relative to the main shell 10 and generator shell 35. The end plates 94 and 95 attached at the end of shell 10 seal and form the end portions of the various compartments within the shell, and since the heat exchange tubes extend through to the outside of end plates 94 and 95, the end plates form the tube sheets for all of the heat exchangers in primary shell 10. The headers 24, 27, 30, 33, 43, 46, 68 and 69 are then mechanically attached to these end plates for distributing the various fluids through the heat exchange tubes.

The absorber 16 is in vapor communication with the evaporator 14. Condenser 12 is in liquid communication with the evaporator 14 through the orifice 50. The condenser 12 receives refrigerant liquid from heat exchange tubes 44 via connection 48 and is also in vapor communication with the low pressure generator 20 through liquid eliminators 49.

While the absorption refrigeration system of the present invention has been disclosed in conjunction with one form of absorption apparatus, it must be understood that the absorption refrigeration compositions and methods of the invention may be employed with other absorption refrigeration systems of different design, such as that of applicants' aforesaid prior U.S. Pat. No. 3,296,814 or other systems conventionally employed in absorption refrigeration. While the fluoroalcohol additives are generally used singly, in some instances mixtures of two or more fluoroalcohols may be used. For example, a mixture of 1H, 1H, 7H-Dodecafluoro-1-Heptanol and 1,1,1-Trifluoro-2-octanol has been used.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. An absorption heat exchange system comprising a heat exchange apparatus with a liquid absorbent composition in said apparatus, said absorbent composition comprising an aqueous brine solution and at least one fluoroalcohol admixed therewith in a small but effective amount to increase the rate of absorption of the brine solution.

2. An absorption heat exchange system according to claim 1 further characterized in that said system is an absorption refrigeration system comprisng, in combination an absorption refrigeration apparatus comprising at least one generator, a condenser, an evaporator and an absorber connected to form a refrigeration unit, with an absorbent composition in said apparatus, said absorbent composition comprising an aqueous brine solution and at least one fluoroalocohol admixed therewith in a small but effective amount to increase the rate of absorption of the brine solution.

3. An absorption refrigeration system according to claim 2 further characterized in that said apparatus comprises a first stage high pressure, high temperature generator and a second stage low pressure, lower temperature generator, said generators being connected whereby vapor generated said first stage generator flows into said second stage generator, said fluoroalcohol additive being stable at higher operating temperature of said first generator.

4. An absorption heat exchange system according to claim 1 further characterized in that said aqueous brine solution consists essentially of lithium bromide in concentration between about 55 and 80 percent.

5. An absorption heat exchange system according to claim 1 further characterized in that said fluoroalcohol has the formula:

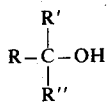

in which:
A. R, R' and R'' are selected from the group consisting of hydrogen, straight chain, branched chain and cyclic hydrocarbon radicals, and straight chain, branched chain and cyclic hydrofluorocarbon radicals;
B. the total number of carbon atoms is from 5 to 10 per molecule;
C. at least one group per molecule is present, selected from the class consisting of

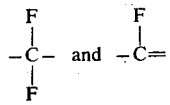

D. no fluorine is present on the same carbon as the hydroxyl group;
E. the melting point is below 32° F; and
F. the boiling point is at least 270° F.

6. An absorption heat exchange system according to claim 5 further characterized in that said fluoroalcohol is non-symmetrical with respect to the location of the hydroxyl group.

7. An absorption heat exchange system according to claim 1 further characterized in that said fluoroalcohol is present in the absorbent composition in the proportion of at least about 10 milligrams per liter of brine.

8. A method of heat exchange in an absorption heat exchange system using an aqueous heat exchange fluid comprising the steps of passing a liquid absorbent composition comprising an aqueous brine solution and at least one fluoroalcohol in a small but effective amount to increase the rate of absorption of the brine solution in absorptive relationship with said heat exchange fluid, separating the absorbed heat exchange fluid from the brine solution and recycling the brine solution.

9. A method according to claim 8 of producing refrigeration in an absorption refrigeration system using water as a refrigerant comprising the steps of passing an absorbent composition, comprising an aqueous brine solution and at least one fluoroalcohol in a small but effective amount to increase the rate of absorption of the brine solution, to at least one heating zone to generate water vapor and concentrate said solution, passing the water vapor to a condensing zone in which the water vapor is condensed to liquid water by transferring heat to a heat sink, passing said liquid water to an evaporating zone, passing said absorbent solution to an absorbing zone in fluid communication with said evaporating zone and transferring heat from said absorbing zone to a heat sink while maintaining said absorbent solution in a liquid state at temperatures of about 104° F and above to maintain an evaporator temperature of about 40° and passing said absorbent solution from said absorbing zone to said heating zone to be reconcentrated.

10. A method according to claim 9 further characterized in that said absorbent solution is passed to a first heating zone maintained at high pressure and high temperature and the vapors therefrom are then passed to a second heating zone maintained at low pressure and lower temperature.

11. A method according to claim 9 further characterized in that said aqueous brine solution consists essentially of lithium bromide in concentration between about 55 and 80 per cent.

12. A method according to claim 8 further characterized in that said fluoroalcohol has the formula:

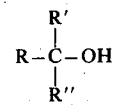

in which:
A. R, R' and R'' are selected from the group consisting of hydrogen, straight chain, branched chain and cyclic hydrocarbon radicals, and straight chain, branched chain and cyclic hydrofluorocarbon radicals;
B. the total number of carbon atoms is from 5 to 10 per molecule;
C. at least one group per molecule is present, selected from the class consisting of

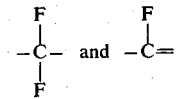

D. no fluorine is present on the same carbon as the hydroxyl group;
E. the melting point is below 32° F; and
F. the boiling point is at least 270° F.

13. A method according to claim 12 further characterized in that said fluoroalcohol is non-symmetrical with respect to the location of the hydroxyl group.

14. A method according to claim 8 further characterized in that said fluoroalcohol is present in the absorbent composition in the proportion of about 10 milligrams to about 1,000 milligrams per liter of brine.

15. An absorbent composition for use in an absorption heat exchange system using water as a heat exchange fluid, said composition comprising an aqueous brine solution and at least one fluoroalcohol in a small but effective amount to increase the rate of absorption of the brine solution.

16. An absorbent composition according to claim 15 further characterized in that said aqueous brine solution consists essentially of lithium bromide in concentration between about 55 and 80 percent.

17. An absorbent composition according to claim 15 further characterized in that said fluoroalcohol has the flurmua:

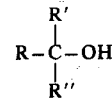

in which:

A. R, R' and R'' are selected from the group consisting of hydrogen, straight chain, branched chain and cyclic hydrocarbon radicals, and stright chain, branched chain and cyclic hydrofluorocarbon radicals;
B. the total number of carbon atoms is from 5 to 10 per molecule;
C. at least one group per molecule is present, selected from the class consisting of

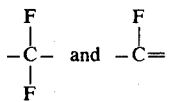

D. no fluorine is present on the same carbon as the hydroxyl group;
E. the melting point is below 32° F; and
F. the boiling point is at least 270° F.

18. An absorbent composition according to claim 17 further characterized in that said fluoroalcohol is non-symmetrical with respect to the location of the hydroxyl group.

19. An absorbent composition according to claim 15 further characterized in that said fluoroalcohol is present in the absorbent composition in the proportion of about 10 milligrams to about 1,000 milligrams per liter of brine.

* * * * *

PO-1050
(5/69)

UNITED STATES PATENT OFFICE
CERTIFICATE OF CORRECTION

Patent No. 3,783,631    Dated January 8, 1974

Inventor(s) Robert J. Modahl et al

It is certified that error appears in the above-identified patent and that said Letters Patent are hereby corrected as shown below:

Column 3, line 14, at the end of the line, ";" should be --:--.

Column 6, line 64, "tubs" should be --tubes--.

Column 7, line 16, "exhcange" should be --exchange--.

Claim 2, line 3, "comprisng" should be --comprising--.

Claim 17, line 3, "flurmua" should be --formula--.

Claim 17, subparagraph A, line 3, "stright" should be --straight--

Signed and sealed this 16th day of April 1974.

(SEAL)
Attest:

EDWARD M. FLETCHER, JR.
Attesting Officer

C. MARSHALL DANN
Commissioner of Patents